(12) United States Patent
Mai et al.

(10) Patent No.: US 7,724,339 B2
(45) Date of Patent: May 25, 2010

(54) LIQUID CRYSTAL DISPLAY WITH ELECTRICAL CONNECTOR

(75) Inventors: Che-Kuei Mai, Miao-Li (TW); Fei-Hong Chen, Shenzhen (CN)

(73) Assignees: Innocom Technology (ShenZhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 343 days.

(21) Appl. No.: 11/788,988

(22) Filed: Apr. 23, 2007

(65) Prior Publication Data
US 2007/0247563 A1 Oct. 25, 2007

(30) Foreign Application Priority Data
Apr. 21, 2006 (TW) .............................. 95114351 A

(51) Int. Cl.
*G02F 1/1335* (2006.01)
*G02F 1/1333* (2006.01)
(52) U.S. Cl. .......................... 349/149; 349/58; 349/64; 349/69; 349/150
(58) Field of Classification Search ....................... None
See application file for complete search history.

(56) References Cited

U.S. PATENT DOCUMENTS

| 7,113,236 | B2 |   | 9/2006 | Du |   |
|---|---|---|---|---|---|
| 2002/0008805 | A1 |   | 1/2002 | Kawakami et al. |   |
| 2002/0027634 | A1 | * | 3/2002 | Kang et al. | 349/150 |
| 2006/0203140 | A1 | * | 9/2006 | Kim | 349/58 |
| 2007/0153159 | A1 | * | 7/2007 | Jung | 349/69 |

FOREIGN PATENT DOCUMENTS

CN 1325036 A 12/2001

* cited by examiner

*Primary Examiner*—Tina M Wong
(74) *Attorney, Agent, or Firm*—Wei Te Chung

(57) ABSTRACT

An exemplary liquid crystal display includes a liquid crystal panel (10), a light guide plate (12) located below the liquid crystal panel, an illuminator (16) located adjacent a side of the light guide plate, and an electrical connector (15) attached to a side of the light guide plate and receiving the illuminator therein. The illuminator is mechanically attached to the electrical connector, and contact points of the illuminator are in direct physical and electrical connection with corresponding contact points of the electrical connector.

16 Claims, 2 Drawing Sheets

LIQUID CRYSTAL DISPLAY WITH ELECTRICAL CONNECTOR

FIELD OF THE INVENTION

The present invention relates to a liquid crystal display (LCD) with an electrical connector.

GENERAL BACKGROUND

Liquid crystal displays are commonly used as displays for compact electronic apparatuses. This is because liquid crystal displays not only provide good quality images using little power, but are also conveniently thin.

Referring to FIG. 4, a typical liquid crystal display 4 includes a liquid crystal panel 40, an optical film assembly 41, a light guide plate (LGP) 42, a printed circuit board (PCB) 43, a light emitting diode (LED) 44, a first flexible printed circuit board (FPC) 45 and a second FPC 46. The liquid crystal panel 40, the optical film assembly 41, the light guide plate 42 and the PCB 43 are arranged from top to bottom in that order. The first FPC 45 bends away from the liquid crystal panel 40 and is electrically connected to the PCB 43. The second FPC 46 is located adjacent to the light guide plate 42 and is electrically connected to the PCB 43. The LED 44 is fixed at the second FPC 46.

The LED 44 is generally fixed at the second FPC 46, by a soldering method using tin or lead. Tin and lead are materials potentially harmful to human health and may contribute to environmental pollution. The liquid crystal display 4 may be restricted or even prohibited from sale in countries with strict environmental protection laws.

What is needed, therefore, is a liquid crystal display that can overcome the above-described deficiencies.

SUMMARY

In one embodiment, a liquid crystal display includes a liquid crystal panel, a light guide plate located below the liquid crystal panel, an illuminator located adjacent a side of the light guide plate, and an electrical connector attached to a side of the light guide plate and receiving the illuminator therein. The illuminator is mechanically attached to the electrical connector, and contact points of the illuminator are in direct physical and electrical connection with corresponding contact points of the electrical connector.

Other novel features and advantages will become more apparent from the following detailed description when taken in conjunction with the accompanying drawings.

BRIEF DESCRIPTION OF THE DRAWINGS

The components in the drawings are not necessarily drawn to scale. The emphasis is, instead, placed upon clearly illustrating the principles of different embodiments of the present invention. In the drawings, like reference numerals designate corresponding parts throughout various views and all the views are schematic.

DETAILED DESCRIPTION OF PREFERRED EMBODIMENTS

Reference will now be made to the drawings to describe the present invention in detail.

Figure 1:
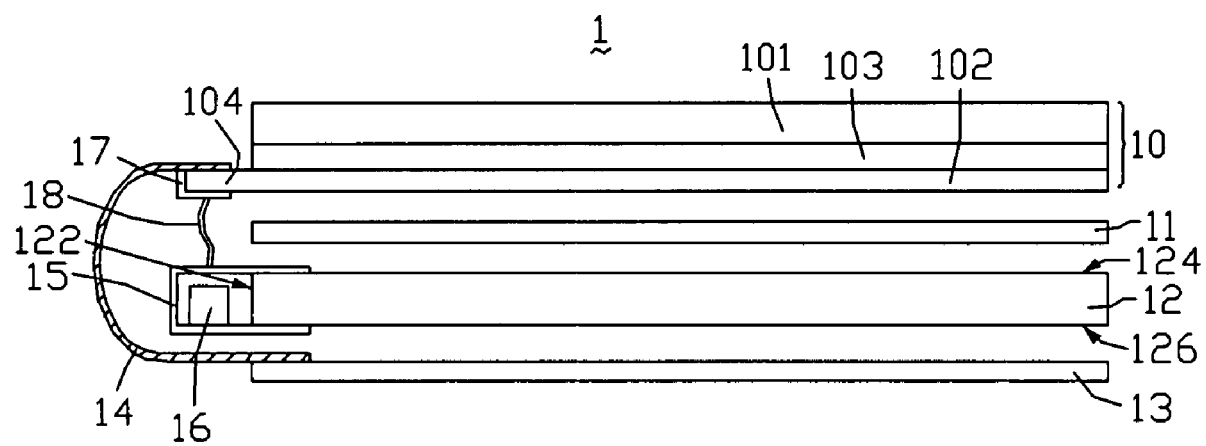
FIG. 1 is a side, cross-sectional view of a liquid crystal display according to an exemplary embodiment of the present invention, the liquid crystal display including a liquid crystal panel, an FPC and a pair of conductive terminals (only one visible).

In FIG. 1, a liquid crystal display 1, according to an exemplary embodiment of the present invention, is shown. The liquid crystal display 1 includes a liquid crystal panel 10, an optical film assembly 11, a light guide plate 12, a PCB 13, an FPC 14, an electrical connector 15, a point illuminator 16, a pair of conductive terminals (only one visible) 17 and a conductive wire 18.

The liquid crystal panel 10, the optical film assembly 11, the light guide plate 12 and the PCB 13 are arranged from top to bottom, respectively, in that order. The liquid crystal panel 10 includes an upper substrate 101, a lower substrate 102 opposite to the upper substrate 101, and a liquid crystal layer 103 sandwiched between the upper substrate 101 and lower substrate 102. The lower substrate 102 includes an extending portion 104, which protrudes out from one end of the liquid crystal panel 10.

Figure 2:
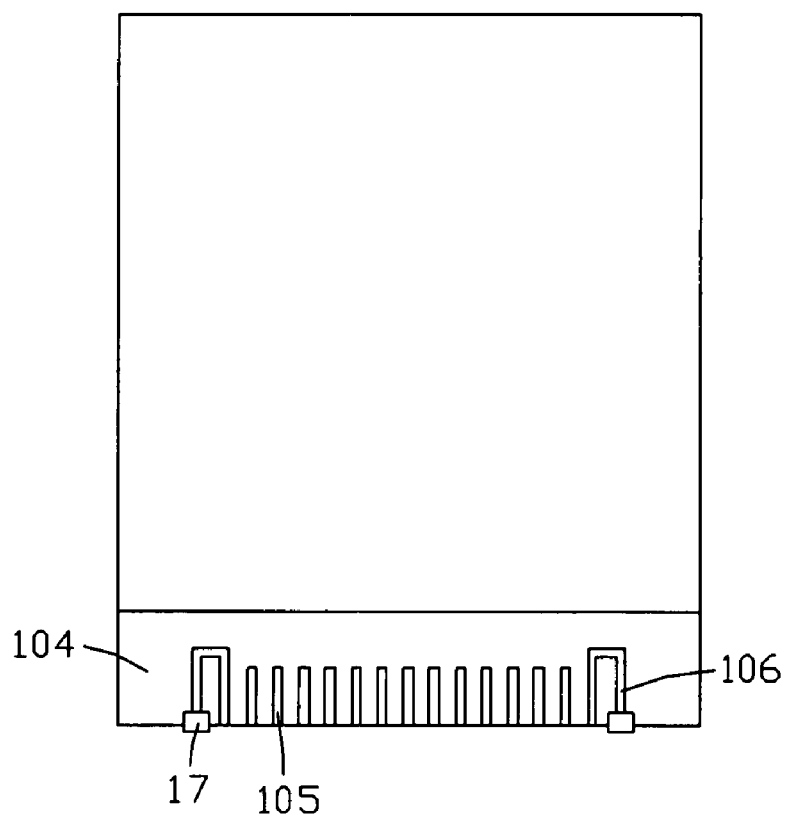
FIG. 2 is a top, plan view of the liquid crystal panel of FIG. 1.
Figure 3:
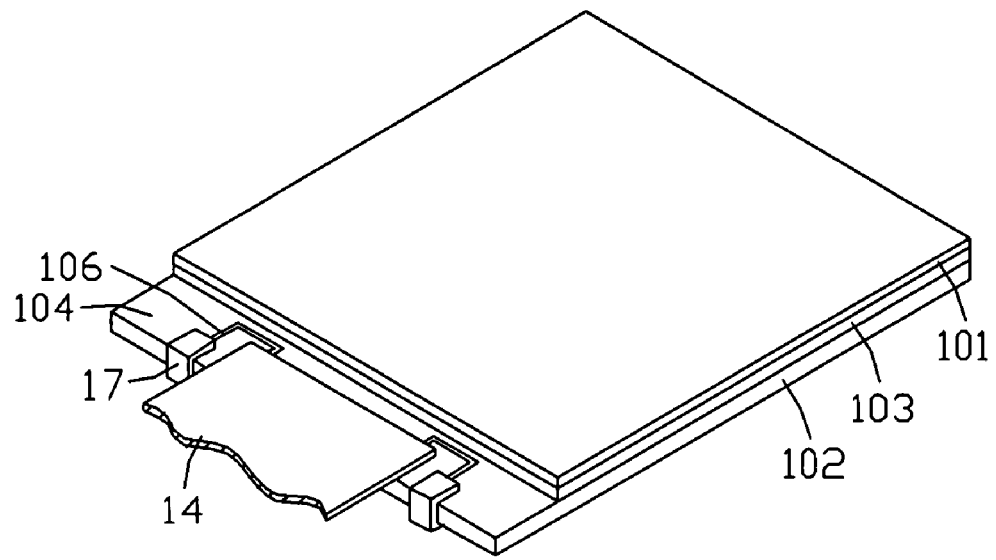
FIG. 3 is an isometric view of the liquid crystal panel of FIG. 1, showing the conductive terminals and part of the FPC.
Figure 4:
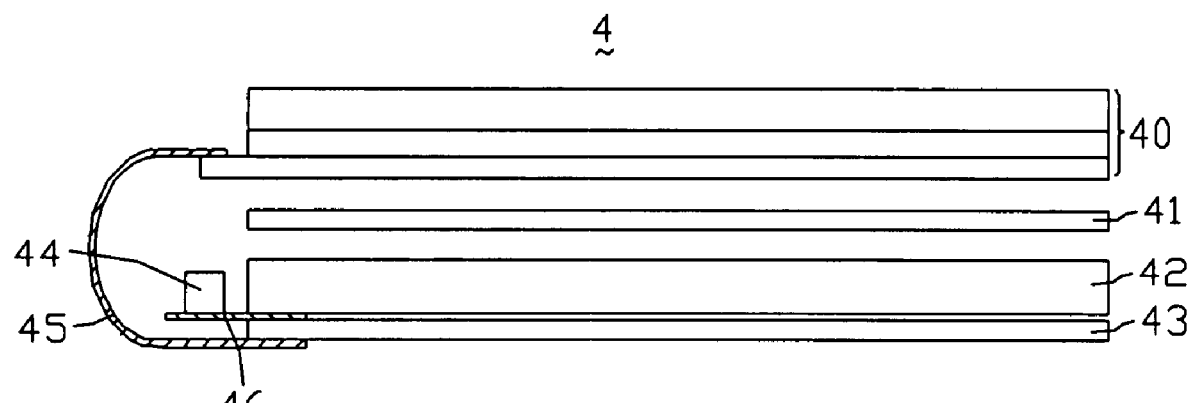
FIG. 4 is a side, cross-sectional view of a conventional liquid crystal display.

Referring also to FIG. 2, the extending portion 104 includes a plurality of first conductive strips 105 and two second conductive strips 106. The first strips 105 and the second strips 106 inwardly extend from a free edge of the extending portion 104. The first strips 105 are substantially linear and are parallel to each other. In the illustrated embodiment, the distance between every two adjacent first strips 105 is constant. The second strips 106 are, respectively, formed at two opposite sides of the plurality of first strips 105. Each of the second strips 106 is generally U-shaped, and is longer than each of the first strips 105. The first strips 105 and the second strips 106 are all made from indium tin oxide (ITO) or indium zinc oxide (IZO).

Referring to FIG. 1, the FPC 14 bends away from a top side of the extending portion 104 down to the PCB 13. A first end (not labeled) of the FPC 14 is attached, by a tape automatic bonding (TAB) method, to the top side of the extending portion 104 and is electrically connected to the first strips 105. An opposite second end (not labeled) of the FPC 14 is attached and electrically connected to the PCB 13. The conductive terminals 17 are located at two opposite sides of the first end of the FPC 14. Each of the conductive terminals 17 is substantially U-shaped, and includes two parallel feet (not labeled). The two feet of each conductive terminal 17 are, respectively, clipped to one of the second strips 106 of the top side and to a bottom side of the extending portion 104.

The light guide plate 12 includes a light incident surface 122, a light emitting surface 124 perpendicular to the light incident surface 122, and a bottom surface 126 opposite to the light emitting surface 124. The electrical connector 15 is elongate, and has a substantially U-shaped profile. Two ends (not labeled) of the electrical connector 15 are firmly clipped to edge portions of the light emitting surface 124 and the bottom surface 126, respectively. The point illuminator 16 is located adjacent to the light incident surface 122 and is substantially enclosed on three sides by the electrical connector 15. In particular, the point illuminator 16 is supported by a bottom one of horizontal plate portions of the electrical connector 15 and is electrically connected to the horizontal plate portion. For example, the point illuminator 16 can be mechanically connected to the horizontal plate portion by any of various means known in the art, with electrical contact points (not shown) of the point illuminator 16 mechanically and electrically engaging with corresponding electrical contact points (not shown) of the horizontal plate portion. That is, the contact points of the point illuminator 16 directly physically engage with the contact points of the horizontal plate portion and thereby establish electrical connection therebetween, without the need for soldering with tin or lead. In the illustrated embodiment, the point illuminator 16 is a light emitting diode (LED), and inner surfaces (not labeled) of the electrical connector 15 are coated with a reflective material to improve a light utilization ratio of the liquid crystal display 1.

The electrical connector 15 is electrically connected with each conductive terminal 17 via one of the conductive wires 18. Thus, the PCB 13 can provide electrical power for the point illuminator 16 via the FPC 14, the second strips 106, the conductive terminals 17, the conductive wires 18 and the electrical connector 15.

In summary, the point illuminator 16 is supported by the electrical connector 15, and is provided with electrical power via the PCB 13, the FPC 14, the second strips 106, the conductive terminals 17, the conductive wires 18 and the electrical connector 15. Thus, the point illuminator 16 can provide light for the liquid crystal display 1. Unlike in comparable conventional liquid crystal displays, no tin or lead is needed to solder the point illuminator 16 to the electrical connector 15. Thus, the liquid crystal display 1 is nonhazardous and can be sold in countries with strict environmental protection laws.

Further or alternative embodiments may include the following. In one example, the liquid crystal display 1 may further include a reflective film located adjacent to the bottom surface 126 of the light guide plate 12. In another example, there can be plural point illuminators 16. In a further example, two opposite sides of the point illuminator 16 can closely contact the light incident surface 122 and an inner surface of a vertical plate portion of the electrical connector 15.

It is believed that the present embodiments and their advantages will be understood from the foregoing description and it will be apparent that various changes may be made thereto, without departing from the spirit or scope of the invention or sacrificing all of its material advantages. The examples hereinbefore described are merely preferred or exemplary embodiments of the invention.

What is claimed is:

1. A liquid crystal display comprising:
    a liquid crystal panel, the liquid crystal panel comprising a plurality of first conductive strips and two second conductive strips, the first and second strips formed at an edge portion of the liquid crystal panel;
    a light guide plate located below the liquid crystal panel;
    an illuminator located adjacent a side of the light guide plate; and
    an electrical connector attached to a side of the light guide plate and receiving the illuminator therein;
    two conductive terminals, electrically connected to the second strips respectively; and
    a conductive wire, the conductive terminals electrically connected to the electrical connector via the conductive wire, the illuminator mechanically attached to the electrical connector, and contact points of the illuminator being in direct physical and electrical connection with corresponding contact points of the electrical connector.

2. The liquid crystal display as claimed in claim 1, wherein the illuminator is a point illuminator.

3. The liquid crystal display as claimed in claim 2, wherein the illuminator is a light emitting diode.

4. The liquid crystal display as claimed in claim 1, wherein inner surfaces of the electrical connector have reflective material applied thereon.

5. The liquid crystal display as claimed in claim 1, wherein the second strips are formed at two opposite sides of the plurality of first strips.

6. The liquid crystal display as claimed in claim 1, wherein the first strips are essentially parallel to each other.

7. The liquid crystal display as claimed in claim 1, wherein each of the second strips is U-shaped.

8. The liquid crystal display as claimed in claim 1, further comprising a flexible printed circuit board bending away from the liquid crystal panel, wherein the flexible printed circuit board comprises one end electrically connected to the first and second strips.

9. The liquid crystal display as claimed in claim 8, further comprising a printed circuit board located below the light guide plate, wherein the other end of the flexible printed circuit board is electrically connected to the printed circuit board.

10. The liquid crystal display as claimed in claim 1, wherein the light guide plate comprises a light incident surface adjacent to the illuminator, a light emitting surface perpendicular to the light incident surface and a bottom surface opposite to the light emitting surface.

11. The liquid crystal display as claimed in claim 10, wherein the electrical connector comprises two ends, respectively, clipped at the light emitting surface and the bottom surface of the light guide plate.

12. A liquid crystal display comprising:
    a liquid crystal panel comprising:
        a plurality of conductive strips formed at an edge portion thereof; and
        a conductive terminal attached to the edge portion of the liquid crystal panel and electrically connected to one of the conductive strips;
    a light guide plate located below the liquid crystal panel, the light guide plate comprising a side light incident surface;
    an illuminator located adjacent the light incident surface of the light guide plate;
    an electrical connector attached to a side of the light guide plate, the electrical connector receiving the illuminator therein, the illuminator mechanically attached to the electrical connector, and contact points of the illuminator being in direct physical and electrical connection with corresponding contact points of the electrical connector, and the electrical connector electrically coupled to the conductive terminal; and
    a flexible printed circuit board electrically connected to the conductive strips of the liquid crystal panel, the flexible printed circuit board thereby capable of conveying electrical power to the liquid crystal panel.

13. The liquid crystal display as claimed in claim 12, wherein the illuminator is a light emitting diode.

14. The liquid crystal display as claimed in claim 12, further comprising a printed circuit board located below the light guide plate, wherein the other end of the flexible printed circuit board is electrically connected to the printed circuit board.

15. The liquid crystal display as claimed in claim 12, wherein the light guide plate further comprises a light emitting surface perpendicular to the light incident surface and a bottom surface opposite to the light emitting surface.

16. The liquid crystal display as claimed in claim 15, wherein the electrical connector comprises two ends, respectively, clipped at the light emitting surface and the bottom surface of the light guide plate.

* * * * *